United States Patent [19]

Bronnert

[11] Patent Number: 5,092,230
[45] Date of Patent: Mar. 3, 1992

[54] STEAM INFUSION FLOAT CONTROL

[76] Inventor: Hervé X. Bronnert, 21495 Partridge Ct., Brookfield, Wis. 53005

[21] Appl. No.: 492,816

[22] Filed: Mar. 13, 1990

[51] Int. Cl.⁵ ...................... G01F 23/62; G01F 23/74; A23C 3/02
[52] U.S. Cl. ...................................... 99/453; 99/470; 99/483; 73/313; 73/322.5
[58] Field of Search .................... 222/51, 67; 137/412; 73/322.5, 319, 313, 216; 340/623, 624; 200/84 C, 84 R; 99/483, 453, 471, 470, 474

[56] References Cited

U.S. PATENT DOCUMENTS

| | | | |
|---|---|---|---|
| 1,072,420 | 9/1913 | Broderick | 73/322.5 |
| 2,243,188 | 5/1941 | Biach | 222/67 |
| 2,621,031 | 12/1952 | Saborio Gonzalez et al. | 73/322.5 |
| 3,114,478 | 12/1963 | Hilkemeier et al. | 222/51 |
| 3,128,625 | 4/1964 | Heineman | 73/313 |
| 4,158,964 | 6/1979 | McCrea et al. | 73/290 V |
| 4,161,909 | 7/1979 | Wakeman | 99/453 |
| 4,248,088 | 2/1981 | McGown et al. | 73/290 V |
| 4,259,975 | 4/1981 | Kinsey, Jr. et al. | 200/84 C |
| 4,776,268 | 10/1988 | Bronnert | 99/453 |
| 4,787,304 | 11/1988 | Bronnert | 99/453 |

FOREIGN PATENT DOCUMENTS

0505784  9/1951  Belgium ........................... 340/624

*Primary Examiner*—William A. Cuchlinski, Jr.
*Assistant Examiner*—John L. Beres
*Attorney, Agent, or Firm*—Foley & Lardner

[57] ABSTRACT

A float control assembly for controlling the flow rate through the discharge duct of a steam infusion apparatus, the assembly including a hollow torus shaped float mounted in the discharge duct a portion of the float projecting above level of fluid in the discharge duct, a magnet mounted in said float, a set of proximity switches mounted on the discharge duct to monitor the position of the magnet in the discharge duct, and a fluid control system response to the position of the float for controlling the rate of flow of fluid through the duct.

4 Claims, 2 Drawing Sheets

STEAM INFUSION FLOAT CONTROL

FIELD OF THE INVENTION

The present invention relates to a float control assembly for a steam infusion sterilization apparatus and more particularly to a float control which senses the level of the discharge fluid to control the rate of flow of liquid through the apparatus.

BACKGROUND OF THE INVENTION

In my earlier patents relating to apparatus for sterilization of liquids U.S. Pat. Nos. 4,776,268 and 4,851,250 steam infusers are described which are used to preserve certain food products by the use of steam to sterilize the product. These systems are used for sterilization of dairy products such as milk or ice cream mix but can also be used for other liquid products such as juices.

As described in these patents it is essential to the efficiency of infusion type systems to minimize "burn on" of the walls. This has been accomplished by maintaining a continuous coating of the liquid on the surface of the walls to thereby prevent hot spots from developing which would cause "burn on" of the product.

In this type of a liquid heating system the chamber operates essentially empty of product. The product only flows along the walls of the chamber as a film or in the center of the chamber as a spray. The ideal flow rate through the outlet is 50 gallons per minute with a maximum exposure of the liquid to a temperature of 290° F. The rate of flow of the fluid through the infusion chamber could be controlled by a ball type float which is positioned in the outlet to provide a signal to a transmitter valve as the level of fluid in the outlet rises and falls. Because of the nature of the ball type float the upper surface may be exposed to the temperature within the infusion chamber and if it becomes hot enough "burn on" may occur in the outlet.

SUMMARY OF THE PRESENT INVENTION

The float control assembly according to the present invention is located in the discharge duct at the bottom of the steam infusion chamber. The flow level through the discharge duct is controlled by a circular hollow stainless steel float in the form of a torus. The outer diameter of the float is smaller than the inner diameter of the discharge duct to allow for flow of fluid around the outside of the float as well as through the center of the float. With this arrangement the exposed portion of the float will be covered entirely by fluid as it is discharged from the infusion chamber. The position of the float is monitored by a set of proximity switches located outside of the discharge duct which track and indicate the exact position of the float in the discharge duct. This information is relayed to a transmitter and associated control which adjusts the rate of fluid flow entering the infusion chamber.

Other principal features and advantages of the invention will become apparent to those skilled in the art upon review of the following drawings, the detailed description and the appended claims.

DETAILED DESCRIPTION OF THE DRAWINGS

Figure 1:
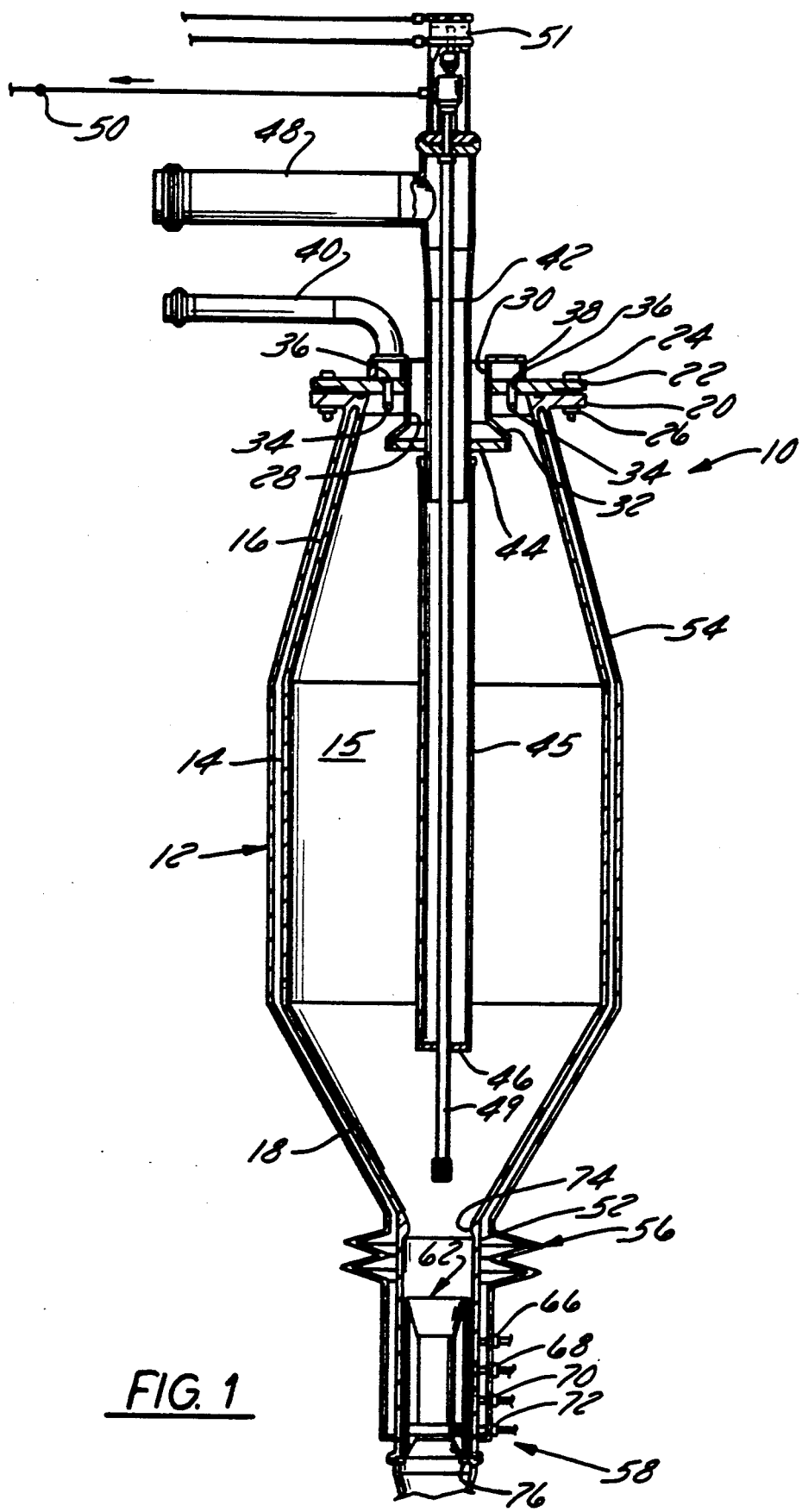
FIG. 1 is a cross sectional view of an infusion chamber showing the float control according to the invention in the discharge duct.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

As is seen generally in FIG. 1 an infusion heating apparatus 10 of the type contemplated herein includes a vertically upstanding hollow closed vessel 12 having a chamber 15 formed by a generally cylindrical central section 14 and frusto-conical shaped upper and lower sections 16 and 18, respectively. A flange 20 is provided at the top of section 16. The top of the vessel 12 is closed by a cover plate 22 which is secured to the flange 20 by bolts 24 and nuts 26. The cover plate 22 includes a center opening 28 and a number of ports 36. A cylindrical member 30 is mounted in the center opening 28 and extends both above and below the cover plate 22. A frusto-conical deflector 32 is mounted on the lower end of member 30 to deflect fluid away from the center of the chamber. The cover plate includes a number of nozzles 34 which are connected to the ports 36 provided in cover plate 22. A housing 38 is mounted on the top of the plate 22 which forms a fluid reservoir above the ports 36. Fluid to be heated is conducted into the housing 38 by means of a delivery pipe 40 for discharge through ports 36 and nozzles 34 into the chamber. The fluid is sprayed into the auxiliary chamber and the chamber 15 and coats the surface of the chamber.

A steam pipe 42 is supported in the cylindrical member 30 by means of an end plate 44 mounted on the bottom of the deflector 32. A steam distribution cylinder 45 is connected to the lower end of pipe 42. The lower end of the cylinder 45 is closed by means of an end cap 46. The cylinder 45 is made of a porous sintered stainless steel which allows for the flow of steam radially outwardly through the walls of the cylinder 45. Steam from a source (not shown) is conducted to the steam pipe 42 by a conduit 48.

An air discharge tube 49 is concentrically mounted in the steam delivery pipe 42 and cylinder 45. The upper end of tube 49 is connected to a discharge tube 50 and is used to remove air and gases from the lower conical section 18 of the vessel 10. The air discharge system is controlled by an air cylinder 5 mounted on the upper end of steam pipe 42. The pipe 42 is closed until the steam chamber has been brought up to operating pressure and then opened to allow the steam to escape to the atmosphere.

Air which is about two times heavier than steam generally concentrates in the bottom of cone 18 and in the discharge duct 52. The air removed through the pipe 49 leaves a small accumulation of air at the bottom of the cone 18. This small accumulation of air prevents steam from flowing through the discharge duct 52. The float is therefore protected from exposure to the temperature of the steam by the accumulation of air in the lower portion of the cone and the product film which covers the float at all times combines to prevent "burn on."

The entire outer surface of the vessel 12 and discharge duct 52 may be enclosed within a water jacket 54 to maintain the walls of the sections 14, 16 and 18 at a predetermined temperature. An expansion joint 56 is provided in the water jacket to compensate for expansion and contraction of the water jacket.

Figure 2:
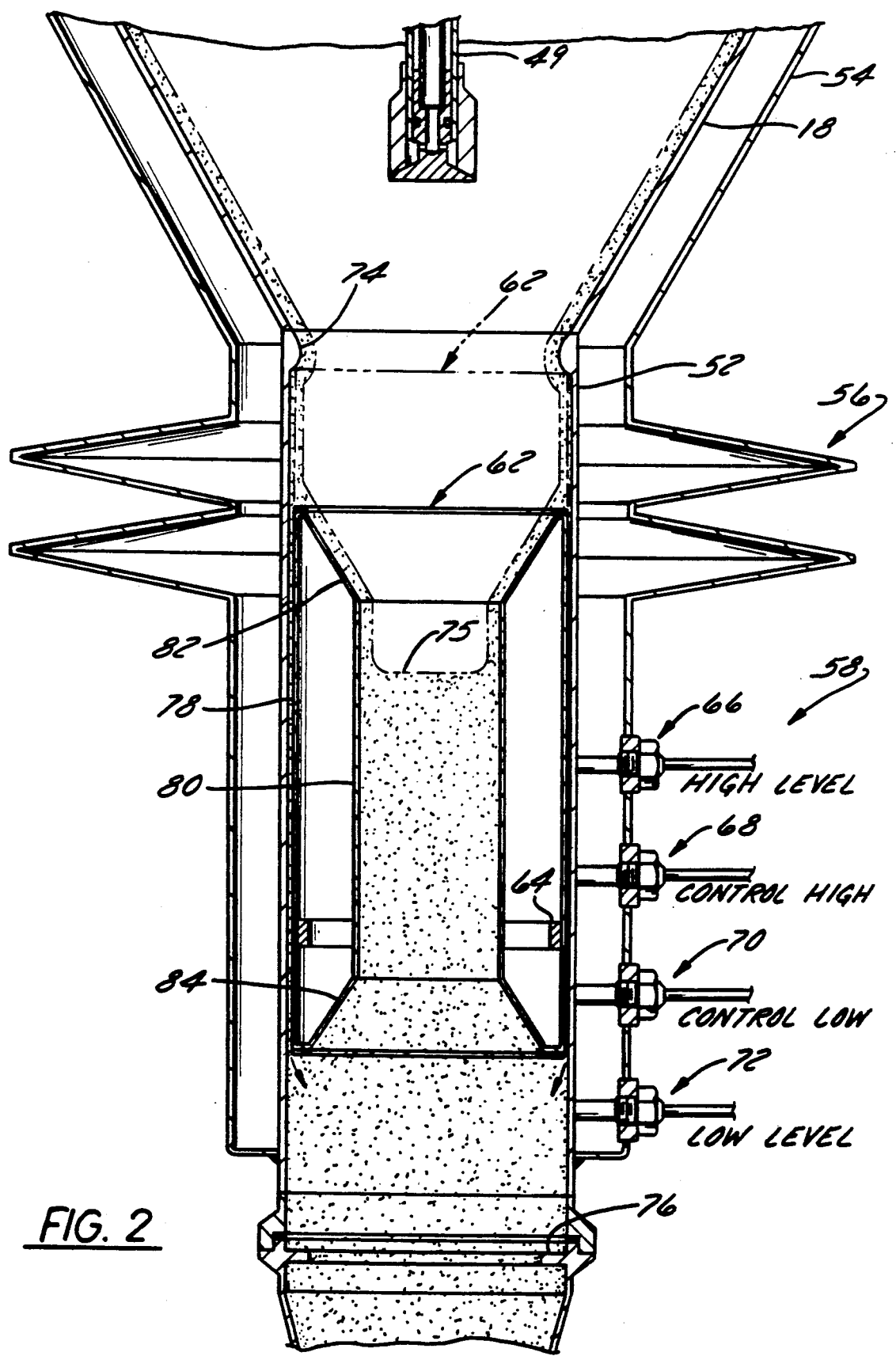
FIG. 2 is an enlarged view of the float control shown in the normal control position.

In accordance with the present invention a level control assembly 58 is provided in the discharge duct 52 to maintain a constant level 75 of fluid in the discharge duct 52. The flow control assembly 58, as seen in FIG. 2, includes a stainless steel cylindrical float 62, having a steel or magnetic ring 64 mounted within the cylindrical float 62. The position of the magnetic ring 64 is sensed by four inductive proximity switches 66, 68, 70 and 72 mounted on the outside of the discharge duct 52 which is also made of stainless steel. The switches are of a conventional type manufactured by Electro Corporation of Sarasota, Fla., 34242. The proximity switches track the position of the steel or magnetic ring 64 and indicate the exact position of the float at all times.

The float 62 is in the form of a cylinder or torus having an outer wall 78 and an inner cylindrical wall 80, the inner wall is connected to the upper end of the outer wall 78 by means of a frusto-conical section 82. The lower end of the inner wall 80 is connected to the lower end of the outer wall 78 by a frusto-conical section 84. The diameter of the outer wall 78 is slightly smaller than the diameter of the discharge duct 52 so the float can move freely up and down within the discharge duct. The float 62 is shown in the normal position in the discharge duct 52 with the magnetic ring 64 located halfway between switches 68 and 70 as shown in the drawing.

The float 62 is normally immersed in the fluid with approximately one-third to one-fourth of the float projecting above the level 75 of the fluid. If the flow rate increases, the level 75 will rise and the float will move upward. As the float starts to move, the signal at switch 68 will increase and the signal at switch 70 will decrease. This information is sent to a conventional transmitter and associated controller (not shown) which adjusts the product flow entering the infusion chamber. As the flow rate decreases the level 75 will drop and the float will return to the normal position. The flow rate is moderated to maintain the float in the normal position. If the float moves downward towards switch 70 the control will adjust the product flow by increasing the flow rate sufficiently to return the float back to its normal position.

The float is limited in its upward motion by a stop 74 located at the entrance to the discharge duct 52 and in its downward position by a flange 76 located at the lower end of the duct 52. It should be noted that the stop 74 is contoured so that the fluid continues to flow over the surface of the float and does not separate from the internal surface of duct 52 and of the stop 74. If the float moves downward far enough to engage flange 76, the fluid will still cover the surface of the float because the flange 76 blocks the space between the float and discharge duct so that all of the fluid flows along the inside surface of the float.

As the product flows down the inside walls of the steam infusion chamber which for example is 24" in diameter and closes to a diameter of 6" at the entrance to the discharge duct 52, the film will thus increase in thickness as it enters the discharge duct. The film will split as it enters the upper conical section 82 of the float. A smaller portion of the product will flow through the space between the outer wall 78 and the inner surface of the duct 52. The major portion of the fluid will flow down the inner surface of the cylindrical wall 80. It should be noted that the float will always be covered with fluid at any position between the upper and lower stops 74 and 76.

Thus, it should be apparent that there has been provided in accordance with the present invention a steam infusion float control that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A fluid discharge control assembly for a steam infusion sterilization apparatus having a chamber, a discharge duct at the lower end thereof, and a continuous flow of fluid down the surface of said chamber for discharge through said duct, said control assembly comprising a hollow cylindrically shaped float positioned in said discharge duct and having an outer diameter smaller than the inner diameter of the discharge duct, said float being continuously coated internally and externally by the flow of fluid into the discharge duct, a magnet mounted in said float and a plurality of proximity switches mounted on the outside of said duct for sensing the position of said magent and being connected to control the flow rate of fluid through said chamber.

2. A flow control assembly for controlling the rate of discharge of fluid from the bottom of a steam infusion chamber having a continuous coating of liquid flowing down the surface of the walls of the chamber into a discharge duct, said assembly comprising a hollow cylindrical shaped float positioned to float in the fluid in the discharge duct, a poriton of the float projecting above the level of fluid in the discharge duct, said float being continuously coated internally and externally by the flow of fluid downwardly through the discharge duct, and means mounted on the outside of said duct for monitoring the position of said float whereby the flow rate is adjusted in response to the position of said float in the duct.

3. A fluid discharge control assembly for a steam infusion sterilization apparatus having a chamber, a discharge duct at the lower end thereof, and a continuous flow of fluid down the surface of said chamber for discharge through said duct, said contorl assembly comprising a hollow cylindrically shaped float positioned in said discharge duct and having an outer diameter smaller than the inner diameter of the discharge duct, said float being continuously coated internally and externally by the flow of fluid into the discharge duct, a magnet mounted in said float and means mounted on the outside of said duct for sensing the position of said magent and being connected to control the flow rate of fluid through said chamber, and wherein said float includes an outer cylindrical wall and an inner cylindrical wall, said walls being connected by conical sections which direct the flow of fluid down both the inside and outside surfaces of said float.

4. A flow control assembly for controlling the rate of discharge of fluid from the bottom of a steam infusion chamber having a continuous coating of liquid flowing down the surface of the walls of the chamber into a discharge ducat, said assembly comprising a hollow cylindrical shaped float positioned to float in the fluid in the discharge duct, a portion of the float projecting above the level of fluid in the discharge duct, said float being continuously coated by the flow of fluid downwardly through the discharge duct, and means mounted on the outside of said duct for monitoring the position of said float whereby the flow rate is adjusted in response to the position of said float in the duct, and wherein said float includes a cylindrical outer surface having a diameter smaller than the diameter of the duct and a cylindrical inner surface spaced from said outer surface and being connected to the upper end of said outer surfacae by a conical section whereby a minor amount of fluid flowing down the walls of said duct flows through the space between the outer surface of the flaot and the duct and the major amount of fluid flows through said inner surface of the float.

* * * * *